United States Patent [19]

Imamura et al.

[11] 4,126,494
[45] Nov. 21, 1978

[54] MAGNETIC TRANSFER RECORD FILM

[75] Inventors: Nobutake Imamura, Tokyo; Yoshinori Mimura, Tachikawa; Toshihiko Kobayashi, Mitaka, all of Japan

[73] Assignee: Kokusai Denshin Denwa Kabushiki Kaisha, Japan

[21] Appl. No.: 733,929

[22] Filed: Oct. 19, 1976

[30] Foreign Application Priority Data

Oct. 20, 1975 [JP] Japan .................. 50-125357
Oct. 20, 1975 [JP] Japan .................. 50-125358

[51] Int. Cl.$^2$ .................. C22C 19/00; C22C 28/00; C22C 38/00
[52] U.S. Cl. .................. 148/31.57; 75/123 E; 75/152; 75/170; 148/101; 148/103; 148/108
[58] Field of Search .................. 148/31.57, 31.55, 100, 148/101, 103, 108; 340/174 NA, 174 TF; 360/114; 75/152, 122, 170, 123 E

[56] References Cited

U.S. PATENT DOCUMENTS

| 3,102,002 | 8/1963 | Wallace et al. | 75/152 |
| 3,124,490 | 3/1964 | Schmeckenbecher | 148/108 |
| 3,472,708 | 10/1969 | Schindler et al. | 148/108 |
| 3,475,738 | 10/1969 | Lovis et al. | 360/114 |
| 3,615,911 | 10/1971 | Nesbitt et al. | 148/101 |
| 3,676,867 | 7/1972 | Bacon et al. | 360/114 |
| 3,856,513 | 12/1974 | Chen et al. | 75/122 |
| 3,949,351 | 4/1976 | Clark et al. | 75/152 |

*Primary Examiner*—Arthur J. Steiner
*Attorney, Agent, or Firm*—Robert E. Burns; Emmanuel J. Lobato; Bruce L. Adams

[57] ABSTRACT

A magnetic transfer record film employed for magneto-optically reading magnetic record patterns. The magnetic transfer record film is formed, as the principal component, of an alloy of a heavy rare earth metal and a transition metal and has an easy axis of magnetization in a direction perpendicular to the film surface and further has an alloy composition included in a range of ± 10% at the periphery of a center alloy composition where the saturation magnetic moment becomes minimum with respect to a change of the composition within a temperature range used. The magnetic transfer record film is deposited on a transparent substrate and positioned closely to a magnetic record medium on which a magnetic record pattern to be observed is stored, so that the magnetic record pattern is transferred to the magnetic transfer record film. An optical system is provided to magneto-optically read out the transferred magnetic record pattern from the magnetic transfer record film.

2 Claims, 20 Drawing Figures

MAGNETIC TRANSFER RECORD FILM

FIELD OF THE INVENTION

This invention relates to a recording medium made of a magnetic material film having an easy axis of magnetization in a direction perpendicular to the film surface and to apparatus using such a recording medium for magneto-optically reading magnetic record patterns.

BACKGROUND OF THE INVENTION

There has been heretofore proposed such a system as a contact-transference of patterns magnetically recorded on a magnetic tape or magnetic disc, etc., onto other magnetic substances. Nevertheless, all of such magnetic tapes or magnetic discs employed in such systems have their easy axis of magnetization primarily in parallel with the film surface. Accordingly, it is extremely difficult to make a transference of high fidelity.

On the other hand, in order to perform the optical reading of magnetic patterns recorded on a magnetic substance of poor reflection factor, there has been heretofore proposed a system which can read such patterns by applying the magneto-optical effect after contact-transferring them once on a magnetic thin film of good reflection factor. In such a system, however, though the transfer magnetic film is effective primarily for the transfer of an analog quality, it is impossible to transfer a digital record in high density. Moreover, since this system uses the longitudinal Kerr-effect, the record image is subject to distortion due to slant observation, and in addition, this system has a detect such that the resolving power is poor because the contrast is not so good.

BRIEF SUMMARY OF THE INVENTION

An object of this invention is to provide a magnetic transfer recording film capable of achieving a transfer of high fidelity.

Another object of this invention is to provide an apparatus for magneto-optically reading magnetic recording patterns obtainable of good-contrast of read images.

In accordance with this invention, a magnetic transfer record film is formed, as the principal component, of an alloy of a rare heavy earth metal and a transition metal and has an easy axis of magnetization in a direction perpendicular to the film surface and further has an alloy composition included in a range of ±10% at the periphery of a center alloy composition where the saturation magnetic moment becomes minimum with respect to a change of the composition within a temperature range used. The magnetic transfer record film is deposited on a transparent substrate and positioned closely to a magnetic record medium on which a magnetic record pattern to be observed is stored, so that the magnetic record pattern is transferred to the magnetic transfer record film. An optical system is provided to magneto-optically read out the transferred magnetic record pattern from the magnetic transfer record film.

BRIEF DESCRIPTION OF THE ACCOMPANYING DRAWINGS

The principle, construction and operations of this invention will be clearly understood from the following detailed description taken in conjunction with the accompanying drawings, in which.

DETAILED DESCRIPTION OF THE INVENTION

Figure 1A:
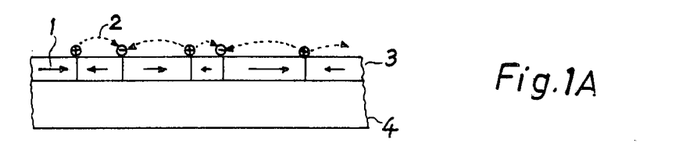
FIGS. 1A, 1B, 2A, 2B, 2C and 2D are cross-sections and plan views explanatory of conventional magnetic transfer techniques.
Figure 1B:
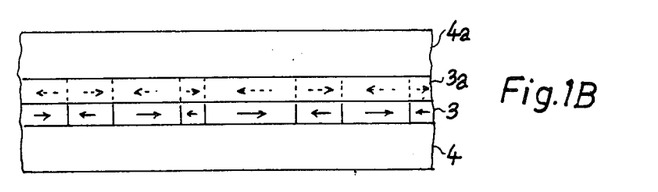
Figure 2A:
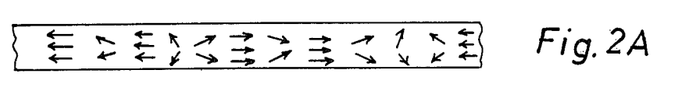
Figure 2B:
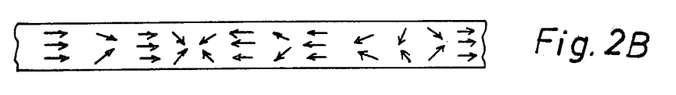
Figure 2C:
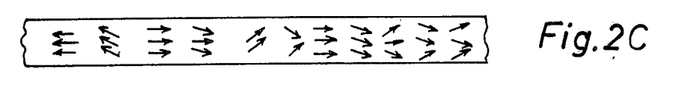
Figure 2D:
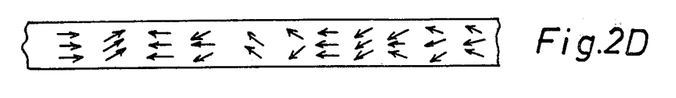

To make differences of this invention from the prior art, a conventional record medium will first be described. As shown in FIG. 1A, nearly all of the magnetic moments 1 of a magnetic substance 3 on a substrate 4 are parallel to the film surface, on which magnetic patterns are recorded, so that the distribution of magnetization varies along the film surface. Since the magnetic moments 1 are included in the film surface, the magnetic lines of force 2 produced from the recorded patterns, tend to converge into the negative magnetic pole, as there are produced the magnetic lines of force from the positive magnetic pole to which the magnetic moments 1 are opposed to each other. In consequence, when the distance between the positive magnetic pole and the negative pole is short, the magnetic stray field along the magnetic line of force becomes strong while it becomes weak when the distance is long. This leads to a defect that it is unable to transfer contacting a different magnetic substance on the recorded pattern. As indicated by broken arrows in FIG. 1B, the transferred pattern on a magnetic substance 3a upon a substrate 4a has its magnetic moments reversed to that of the original recorded pattern. Accordingly, if the original pattern is symmetrical with respect to the widthwise direction of the tape as is shown in FIG. 2A, the directions of the magnetic moments of the transferred pattern become reversed, but the transferred pattern produces the identical symmetry in the widthwise direction as the former. As shown in FIG. 2C, however, when the pattern is asymmetrical with respect to the widthwise direction, it must be understood that the transferred pattern fails to become a faithful transfer as shown in FIG. 2D.

Figure 3:
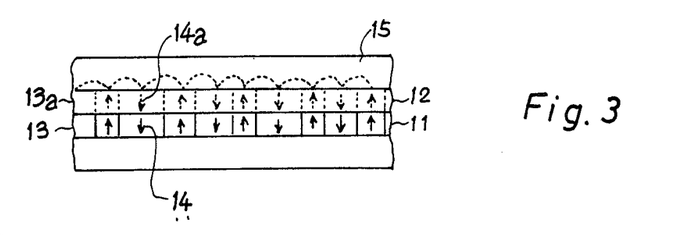
FIG. 3 is a cross-section explanatory of the magnetic transfer using a magnetic transfer record film according to this invention.

With reference to FIG. 3, an example of the invention will be described, in which a recorded pattern 11 on a magnetic record medium 13 having an easy axis of magnetization perpendicular to the film surface is being contact-transferred as a record pattern 12 on a magnetic transfer record film 13a of this invention similarly having an easy axis of magnetization perpendicular to the film surface. The direction 14a of the magnetic lines of force necessary for transference can be seen to be exactly identical with the direction 14 of the internal magnetic moments. Since the magnetic moments vertically align toward the film surface, the polarity of the surface magnetic pole only varies in different location, while the magnetic pole density which determines the strength of the magnetic stray field is the same at any place. In this way, the transfer performance of the invention by using the thin-film having the easy axis of magnetization perpendicular to the film surface thereof can be in a manner far simpler than the convertional transfer, and this invention has a remarkable feature that the transferred pattern 12 faithful to the original record pattern 11 on the magnetic record medium 13 can be obtained on the magnetic transfer record film 13a.

Figure 4A:
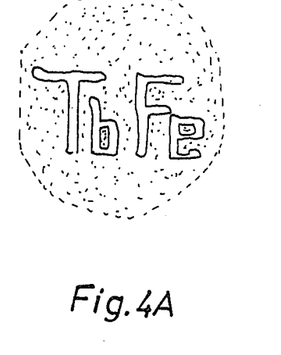
FIGS. 4A, 4B, 6A and 6B are observed photographic views by the use of a magnetic transfer record film of this invention.
Figure 4B:
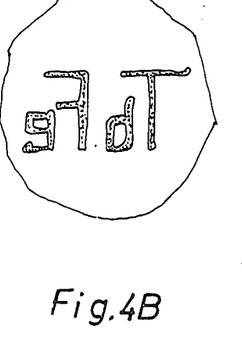

However, even though the film has the easy axis of magnetization perpendicular to the magnetic film surface thereof, when the pattern asymmetrical in the widthwise direction of the tap is transferred and observed, after getting it off the original magnetic medium, from the magnetic transfer record film, it is evident that the transferred pattern, as in the case of FIG. 2, fails to become a faithful pattern. In a case where a magnetic substance having an easy axis of magnetization perpendicular to the film surface and attached on a glass-like transparent substrate 15 as shown in FIG. 3 is employed, the abovesaid asymmetrical contradiction can be solved. Namely, if the transferred pattern is observed from the glass substrate side, it is evident that the observed pattern becomes exactly the same pattern as the transferred pattern. In other words, it implies that the magnetic record pattern stored in the magnetic substance attached on the glass substrate appears quite reversal to each other when observed from the direction of the film surface and that when observed from the direction of the glass substrate. FIGS. 4A and 4B show the letters TbFe stored on a Tb-Fe alloy film when observed respectively from the film side and the glass substrate side through the magnetic Kerr effect, both being quite reversal to each other. In this way if the system of reading out the record pattern on the magnetic substance through the optical means, such as the magnetic Kerr effect, is adopted while a magnetic material having normal easy axis of magnetization attached to a transparent substance such as a glass substrate is employed as a transfer film, it is possible to obtain a transfer pattern completely identical with the original pattern.

Now, as regards the magnetic characteristics of the film of a magnetic material employed as the original record medium 11 and the transfer film 12, it is necessary, in order to conserve the magnetic record pattern, that the M-H loop measured in the direction normal to the film surface possesses a residual magnetic moment in the absence of the magnetic field, and also it is desired that the coercive force Hc is not so small. In this case, since the magnetic force issuing from the original record medium 11 tends to become stronger as the volume, namely, the thickness of the film increases, it is necessary that the volume of the original record thin film 11 is large to some extent. However, as far as the transfer medium 12 is concerned, the thickness of its film is enough if it satisfies the necessity for the magnetic moment to perpendicularly oriented to the film surface. Moreover, even if the characteristics of the transfer film 12 and the original record medium are identical, if the film thickness of the original record medium is sufficiently large as compared with that of the transfer film, it does not matter. In short, if the film has an easy axis of magnetization normal to the film surface and a rectangular hysteresis loop, it is understandable that such film is suitable for a transfer material. In general, however, it is desirable that the coercive force Hc of the original record medium is large in comparison with that Hc of the transfer film.

Figure 5:
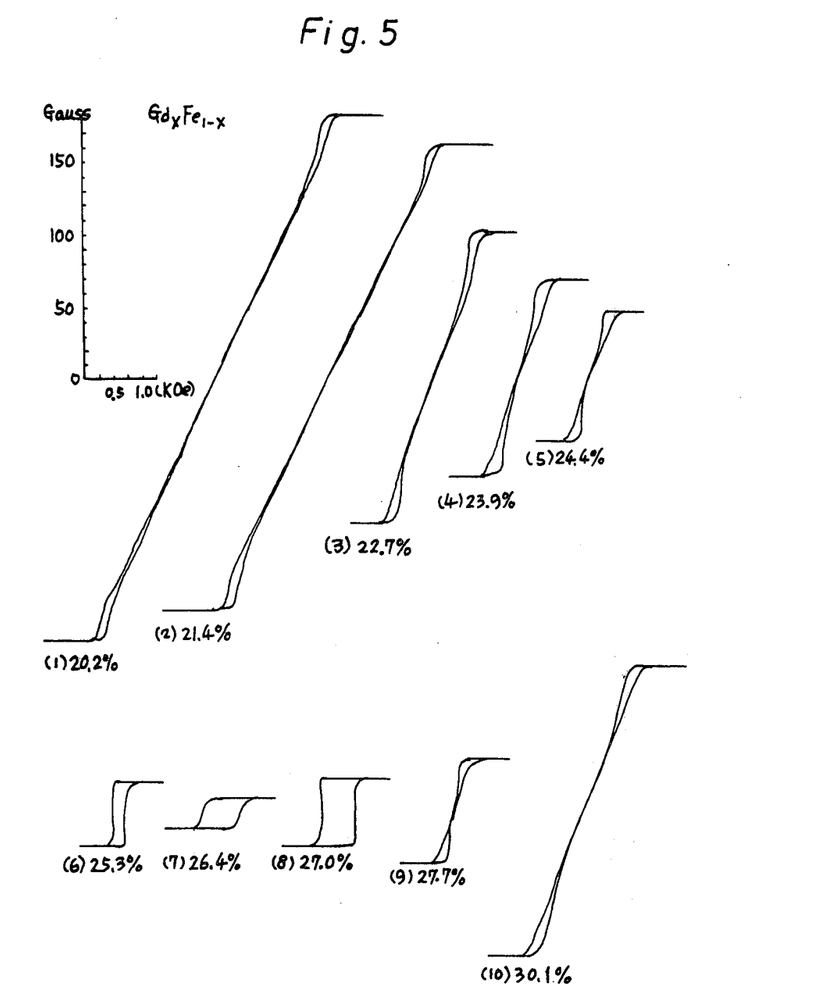
FIG. 5 shows magnetization characteristics of magnetic transfer record films of this invention.

FIG. 5 shows the composition dependency of the M-H loop measured perpendicularly to the film surface of a $Gd_x Fe_{1-x}$ alloy thin film manufactured by the sputtering techniques within a composition range of $0.25 \leq x \leq 0.27$ with respect to the concentration $x$ of Gd, it can be seen that the alloy makes a rectangular MH loop. The MH loop in FIG. 5 was measured at room temperature, and if the measurement temperature changes, the composition range which exhibits the rectangular M-H loop also changes. However, if the temperature at the time of transfer changes, the composition range for providing the rectangular MH loop changes. Accordingly, assuming that transfer is carried out at a temperature range of the room temperature ±100 degrees, the composition range suitable for transfer is $0.15 < x < 0.35$, where the material has an easy axis of magnetization perpendicular to the film surface.

An amorphous GdFe alloy thin film having an easy axis of magnetization perpendicular to the film surface can transfer record patterns on a conventional magnetic tape.

Figure 6A:
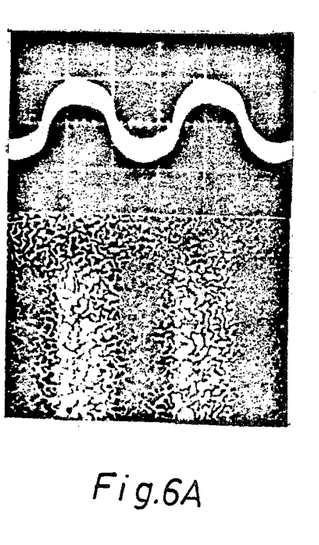
Figure 6B:
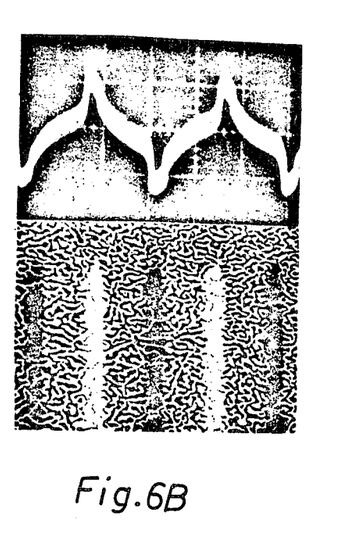

FIGS. 6A and 6B show transfered patterns to a GdFe alloy thin film from magnetic tapes, to which a triangular wave and a rectangular wave are respectively stored as shown by respective read out wave forms. These waveforms were read out through a magnetic head. As understood from FIGS. 6A and 6B the read out waveforms quite correspond to the transferred patterns. In this case, since the conventional magnetic tape has the magnetization in the tape surface, the transferred patterns substantially equivalent to differential waveforms of the stored records. The transferred patterns can be magneto-optically converted to a light signal, so that the magnetic transfer recording medium of this invention can be used as an optical reading head of magnetic patterns.

The above is the case of GdFe alloy thin film; and in the cases of $Gd_xCo_{1-x}$, $Tb_xFe_{1-x}$, and $Tb_xCo_{1-x}$, the film has an easy axis of magnetization perpendicular to the film surface thereof and a composition range having a rectangular M-H loop. Their composition ranges suitable for transfer, inclusive of GdFe, are given as follows.

$Gd_xFe_{1-x}\ 0.2 \leq x \leq 0.3$ $Gd_xCo_{1-x}\ 0.2 \leq x \leq 0.3$ $Tb_xFe_{1-x}\ 0.15 \leq x \leq 0.25$ $Tb_xCo_{1-x}\ 0.15 \leq x \leq 0.25$ Whichever to select as the original record medium or the magnetic transfer record film, is optional, but not limiting to such binary alloys, it is possible to make them ternary or quadruple. In place of Fe, for example, if an alloy, called a permalloy ($Fe_{0.2}Ni_{0.8}$), is used, the coercive force Hc is improved. At any rate, in an alloy of a rare earth metal (especially a heavy rare earth metal) and a transition metal, the composition exhibiting the rectangular MH loop is included in a composition range in the order of ±10% at the periphery of such a center composition, called a compensation composition, that saturation magnetic moment becomes minimum with respect to a change in the composition. This composition range is suitable for the transfer film material.

The record-transfering film having a good rectangular hysteresis loop is suitable for maintaining the transferred patterns in a long time. In a case where the record-transfering film is closely positioned to the surface of a travelling magnetic tape to magneto-optically readout a record, such as an alternating current signal, a record-transfering film having an M-H curve shown in FIG. 5(5) rather than the rectangular hysteresis loop. Accordingly, the shape of the M-H curve should be selected to be suitable for the handled waveform.

In order that an easy axis of magnetization may be provided normal to the film surface, a film thickness must exceed a certain value. However, an alloy of a heavy rare earth metal and a transition metal prepared by the vacuum evaporation and the sputtering method has a critical film thickness of about 500A. Therefore, it is sufficient that the film thickness exceeds 500A. It is preferable to be as thin as possible because transfer operation is easy. However, if the film is too thin, since it permits the passage therethrough of light, the film thickness of about 1000A is preferable.

The observed shape of the transferred pattern varies in accordance with the thickness of the magnetic transfer record film. This can be positively utilized to measure the intensity of a magnetic field. Namely, since the magnetic record pattern can be transferred to a thicker magnetic transfer record film if the intensity of the stray magnetic field generated from a magnetic medium, such as a magnetic tape and a magnetic card, becomes stronger, the intensity of a magnetic field from a magnetic medium can be measured by the use of a plurality of magnetic transfer record film of various thickness.

As described above, by the use of the film of a heavy rare earth metal — a transition metal alloy having the perpendicular easy axis of magnetization, transfer patterns more faithfully than by conventional techniques can be obtained. In addition, since the film has the easy axis of magnetization normal to the film surface and metallic luster, magneto-optical read can be performed. Moreover, since the polar Kerr effect can be utilized, the distortionless read patterns can be obtained. Thus, it can be seen that the transfer materials of the present invention is superior in all respects to the conventional ones.

Accordingly, if only one original already-recorded magnetic disc is available, the same pattern can be transferred on yet-unrecorded magnetic disc of the same size only by lapping on the former. Therefore, the transfer film of the invention is most suitable to the case where a great number of transfer like audiorecords are required. As another instance, for example, since it is possible in accordance with this invention to read magneto-optically the patterns recorded on a magnetic tape of poor reflection factor which employs the so-called fine particles, it is also applicable to light-using communication equipment, electronic computer systems, display elements, etc.

Figure 7:
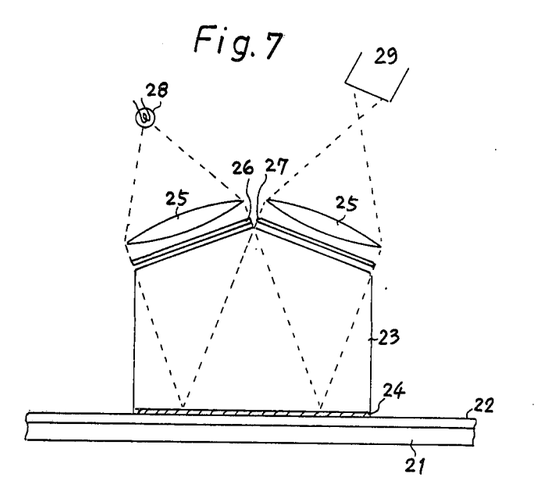
FIG. 7 is a cross-section illustrating an embodiment of the apparatus of this invention.

FIG. 7 illustrates an embodiment of this invention which is designed to read magneto-optically magnetic patterns recorded on the thin film 22 as of $CrO_2$, coated on the tape 21, by contact-transferring the patterns onto a GbFe alloy thin film 24 deposited by vapor deposition or sputtering on the surface of a transparent-material member such as the prism 23 in a manner to provide an easy axis of magnetization in a direction perpendicular to the film surface. Since the magnetic thin film 24 has an easy axis of magnetization in the direction perpendicular to the film surface, the magnetic Kerr effect will utilize the polar effect. Accordingly, the white-black contrast is effectively improved in comparison with the longitudinal effect in a conventional case where the easy axis of magnetization is parallel to the surface of the film. Since the longitudinal effect makes it possible to read the pattern from the slant way by slantwisely admitting light, the transferred image of the pattern becomes diminished in the direction of travel of the light. On the other hand, in the case of the polar Karr effect, since the pattern is read out substantially or perfectly perpendicularly to light, this has a merit of causing no distortion to the transferred pattern.

Figure 8:
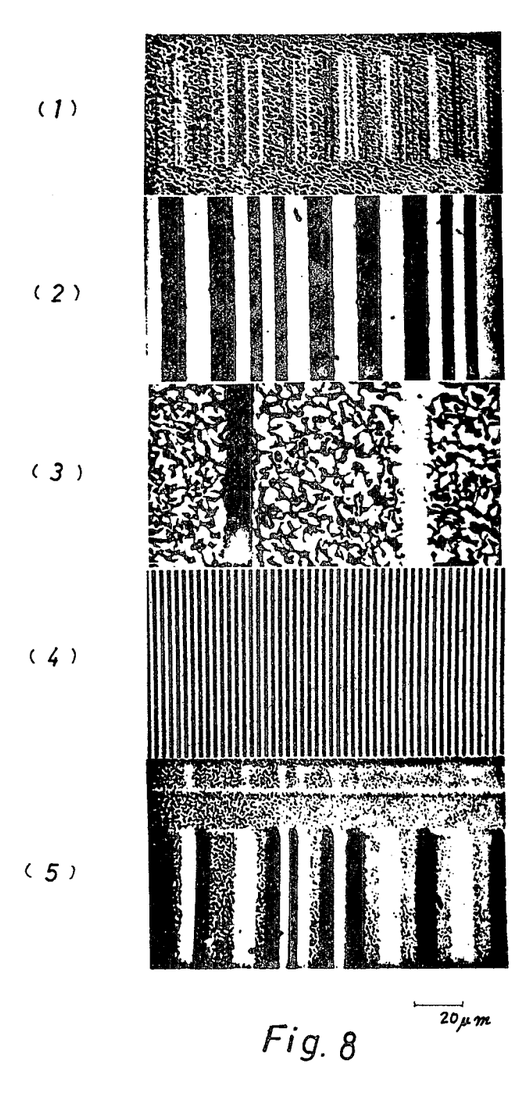
FIG. 8 is photographic views showing examples of observed results by the apparatus of this invention.

FIG. 8 shows observed patterns by an electron microscope on a magnetic transfer record film transferred from a magnetic medium, such as a magnetic tape and a magnetic card. The patterns (1) (2), (3), (4), (5) respectively correspond to a voice signal, a digital pattern on a bank card, a digital pattern on a subway ticket, a test pattern on a computer tape, and a program pattern on a computer tape.

Figure 9A:
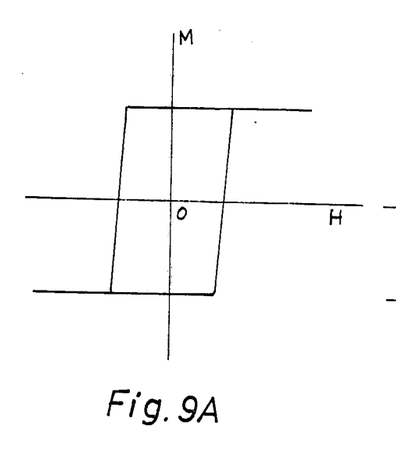
FIGS. 9A and 9B are magnetization characteristics of magnetic transfer record films of this invention.
Figure 9B:
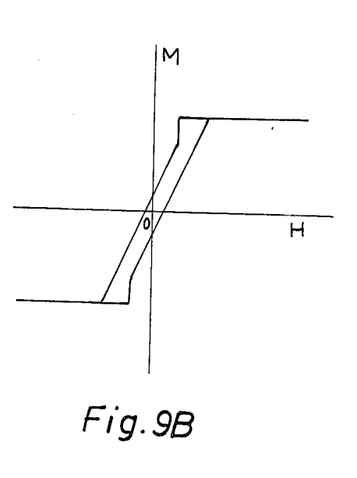

The transfer GdFe film used here has an easy axis of magnetization perpendicular to the film surface as mentioned above, so that this has a great promise to be used as a magnetic bubble material or a thermomagnetic writing material as well. In the case of thermomagnetic writing, magnetic bubbles in the order of 1 micron in diameter are obtainable, and in the case of contact-transfer, it is also possible to transfer the patterns of a size analogous to that order. Generally speaking, as the characteristics of a transfer thin film, the coercive force and the shape of M-H loop viewed perpendicularly to the film surface are important, and in the case of a substantially rectangular M-H loop as shown in FIG. 9A, retention of the transferred image is possible by virtue of residual magnetization, even though there exists no magnetic field. In contrast to the above, in the case of the M-H loop as in FIG. 9B, since there occurs no residual magnetization at zero magnetic field, the transferred image can be seen only when it is in contact transference, so that it permits observation of moving record paterns. In other words, in the case of FIG. 9B, since the coercive force is small, the magnetic energy required for transfer can be smaller than in the case of FIG. 9A. Accordingly, if the shape of the M-H loop is appropriately selected, it is unable for a variety of uses. As for the GdFe film, either the loop of FIG. 9A or the loop of FIG. 9B can be obtained, only by a change in the compostions of Gd and Fe.

As described above, the GdFe film has an easy axis of magnetization perpendicular to the film surface, and furthermore, since the substrate can be formed of such materials as glass, transparent plastic, polyimid, etc., and also since its magnetic property is variable through a change of its composition, it can be seen that such a film is highly suitable for a transfer film.

The scope of applications of the present invention is wide. For example, this invention is usable for visibly observing recorded patterns on a magnetic tape of poor reflection factor. Since patterns are clearly discernible by a visual check in accordance with this invention, the abovesaid film is highly suitable for deciding the quality of recording.

Figure 10:
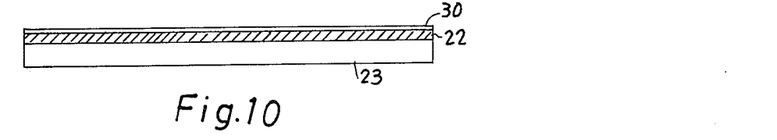
FIG. 10 is a cross-section illustrating an example of a magnetic transfer record film of this invention.

In FIG. 10, the GdFe film 22 and its protective film 30 (e.g., $SiO_2$ film) are deposited on a glass substrate 23. In order to check the magnetic record pattern, the $SiO_2$ film side is placed on the record medium, so that the magnetic record pattern is observed in terms of the polar Kerr-effect through a polarizing microscope, by which it is possible to simply conduct a check of patterns recorded on a magnetic tape.

Figure 11A:
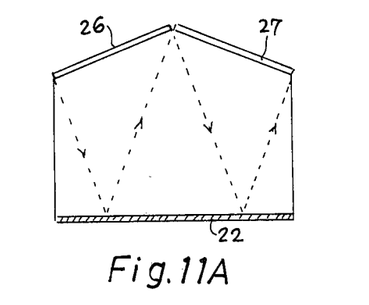
FIGS. 11A, 11B and 11C are cross-sections each illustrating an example of the optical system in this invention.
Figure 11B:
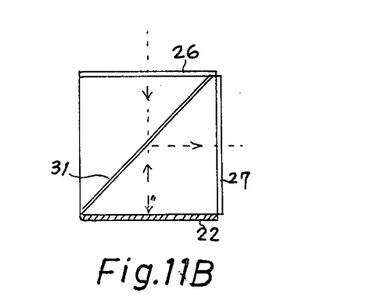
Figure 11C:
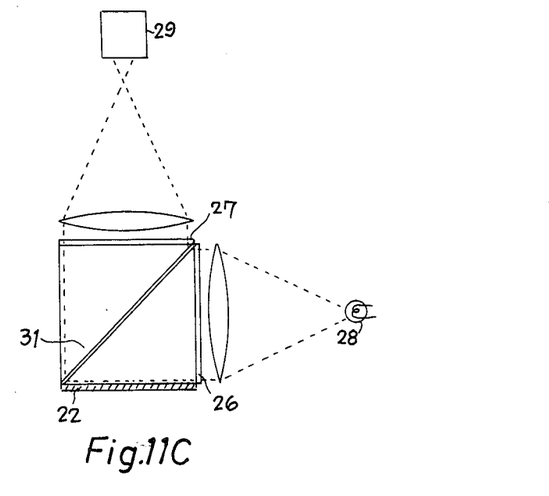

Another embodiment of this invention will be described with reference to FIGS. 11A, 11B and 11C. FIG. 11A shows the system — excluding the portion related to the lens — for human eyes observation; and FIG. 11B also indicates a case for human eyes observation, but by the use of a vertical incident light, which excels the performance of the embodiment of FIG. 11A in so far as the contrast and the distortion of images are concerned. FIG. 11C is analogous to FIG. 11B, except that it has an addition of a lens system thereto. In short, since the transfer film of the present invention has a perpendicularly oriented easy axis of magnetization, the polar Kerr-effect can be utilized as stated above, and in consequence recorded patterns of high density can be optically read. Further, it is applicable to a system having a light circuit. As for the optical system, it is possible to expose the whole patterns to light, or to discern the patterns in the manner of television by sweeping of the spot like a laser beam. In order to accelerate the transfer of recorded patterns, a bias magnetic field may be provided perpendicularly to the surface of the transfer film to an extent of not destroying the recorded patterns.

In case of a colloid TbFe or DyFe transferring film having a large coercive force, the bias magnetic field becomes stronger, so that the record on the transferred film may be destroyed. However, an alloy film formed by colloid heavy rare earth metal, such as Gd, Tb, Dy, Ho, and iron has a curie temperature of 0° to 200° C., while the coercive force Hc becomes smaller as far as the temperature approaches the curie temperature. Accordingly, if the temperature is appropriately raised, the transferring operation can be performed by no use of the bias magnetic field as the thermo-transferring.

If the magnetic transfer record film has any residual magnetization under zero-magnetic field applied thereto, it is desirable that a magnetic field of a damped wave is previously applied to the magnetic transfer record film in the direction of the easy axis of magnetization to erase the residual magnetization before transferring the magnetic record pattern to the film.

What we claim is:

1. A magnetic transfer record film material disposed in a thin film having a thickness exceeding 500Å, an easy axis of magnetization in a direction perpendicular to the film surface and a magnetic coercive force of less than 500 Oe, and comprising an amorphous alloy consisting essentially of a rare earth metal selected from the group consisting of Gd, Tb and Ho and having a concentration X wherein $0.15 < X < 0.35$ and the balance a metal selected from the group consisting of Fe, Co and Ni, and the saturation magnetic moment of the film material being minimum with respect to a change in the concentration X within a temperature range of 100° C. from room temperature.

2. A magnetic transfer record film according to claim 1, in which the thickness thereof is about 1000Å.

* * * * *